Patented Nov. 30, 1943

2,335,808

UNITED STATES PATENT OFFICE 2,335,808

METHOD FOR PRODUCING CHLORINE DIOXIDE

Edward Cornelius Soule, Niagara Falls, N. Y., assignor to The Mathieson Alkali Works, Inc., New York, N. Y., a corporation of Virginia No Drawing. Application September 26, 1941,
Serial No. 412,465

9 Claims. (Cl. 23—152)

My invention relates to improvements in the production of chlorine dioxide from metal chlorates, the alkali metal chlorates, the alkaline earth metal chlorates and the chlorates of other metals forming chlorates.

Conventionally, the generation of chlorine dioxide involves the acidification of a chlorate. This general method is subject to a limitation with respect to chemical efficiency in that the generation of chlorine dioxide is accompanied by the concurrent formation of either chlorine or perchlorates. Also, to the extent that chlorine is a product of the reaction, it contaminates the generated chlorine dioxide. By using oxalic acid as a reducing agent in the reaction, chlorine dioxide substantially free from chlorine can be produced, but the chemical efficiency of the chlorate conversion remains low. The reaction with oxalic acid, moreover, is slow. The actual conversion of chlorate to chlorine dioxide gas substantially free from chlorine as previously obtained has approximated something like one-third to one-half of the chlorate supplied to the reaction. Prior to my discoveries, so far as I know, no method was known for the production of substantially pure chlorine dioxide, and particularly chlorine dioxide substantially free from chlorine, from metal chlorates with substantially complete conversion of the chlorate.

In the process of my invention, a metal chlorate is reacted with sulfuric acid in the presence of a persulphate (the term "persulphate" being employed in the specification and the appended claims to designate persulphuric acid, i. e. hydrogen persulphate—$H_2S_2O_8$, and salts thereof) at a temperature not substantially exceeding 50° C. The persulphate is with advantage used in proportion approximately equivalent to that of the chlorate. While I cannot explain the precise mechanism of the reaction, the following type equation represents the reacting proportions involved:

$$2HClO_3 + H_2S_2O_8 \rightarrow 2H_2SO_4 + O_2 \pm 2ClO_2$$

For example, I do not know whether persulfuric acid is the effective reducing agent or not. However, I have discovered that chlorine dioxide substantially free from chlorine can be produced by this reaction and that, if the proportion of water in the reaction mixture is sufficiently limited, substantially complete conversion of the metal chlorate can be effected. The reaction, moreover, proceeds rapidly. The process of my invention thus has several important advantages. It provides for the production of chlorine dioxide of high purity, particularly with respect to chlorine contamination, and high chemical efficiency with respect to chlorate conversion, and for economy of time and equipment.

In one particularly advantageous embodiment of the process of my invention, I introduce, in small increments or continuously at a low rate, a substantially saturated aqueous solution of metal chlorate and persulphate in approximately reacting proportions into a substantial excess of concentrated sulfuric acid. Proceeding in this manner, the total of free chloric acid in the reaction mixture at any time is very small and decomposition of the chloric acid, except that involved in the formation of chlorine dioxide, is substantially eliminated. In another particularly advantageous embodiment of the process of my invention, concentrated sulfuric acid is introduced, in small increments or continuously at a low rate, into a substantially saturated aqueous solution or an aqueous slurry of metal chlorate and persulphate. The persulphates of the alkali metals, of the alkaline earth metals and ammonium persulphate are useful in the process of my invention, as is hydrogen persulphate (persulfuric acid). With highly concentrated reactants, substantially complete conversion of chlorate to chlorine dioxide can be effected; as the proportion of water present in the reaction mixture increases, the conversion of the chlorate to chlorine dioxide tends to decrease. Chlorine dioxide substantially free from chlorine, however, can be produced with relatively dilute reactants as well as with relatively concentrated reactants. The use of an excess of persulphate, with respect to the metal chlorate, results in loss of unreacted persulphate and also tends to involve some over-reduction of chlorate to chloride, particularly at higher temperatures. The reaction proceeds rapidly at temperatures of 20°–30° C. The reaction is accelerated by higher temperatures, and the conversion of chlorate is sometimes improved by higher temperatures, up to about 50° C.

The process of my invention will be further illustrated by the following specific examples of embodiments of my invention:

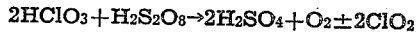

This operation was carried out in a glass generator equipped with an agitator, a feeding burette, a thermometer, an air inlet tube and a gas outlet tube. A slurry consisting of 0.100 mole of chlorate ion as calcium chlorate and 0.0500 mole of sodium persulphate in water, about 0.31 mole of water, was introduced into the generator.

Sulfuric acid, 0.666 mole of commercial 90% $H_2SO_4$, was introduced into the generator through the feeding burette in small increments, with effective agitation, over a period of 35 minutes while maintaining a temperature of 21°–23° C. Air was forced through the generator at a rate sufficient to maintain the partial pressure of the chlorine dioxide below about 100 mm. of mercury. Chlorine dioxide substantially free from chlorine was produced with decomposition of 98.6% of the total chlorate. The molar ratio of chlorine dioxide generated to chlorate (as chlorate ion) decomposed was 0.862, and the molar ratio of persulphate consumed to chlorine dioxide generated was 0.592.

II

This operation was carried out in the same apparatus. A slurry consisting of 0.100 mole of chlorate ion as manganese chlorate, $Mn(ClO_3)_2$, 0.050 mole of sodium persulphate and 0.050 mole of sodium sulphate in about 1.17 moles of water was introduced into the generator. Sulfuric acid, 0.92 mole of commercial 90% $H_2SO_4$, was introduced in small increments, with effective agitation, over a period of 35 minutes while maintaining a temperature of 21°–24° C. Air was forced through the generator at a rate sufficient to maintain the partial pressure of the chlorine dioxide below about 100 mm. of mercury. Chlorine dioxide substantially free from chlorine was produced with decomposition of 91% of the total chlorate. The molar ratio of chlorine dioxide generated to chlorate (as chlorate ion) decomposed was 0.930, and the molar ratio of persulphate consumed to chlorine dioxide generated was 0.500.

III

This operation was carried out in the same apparatus. A slurry consisting of 0.1500 mole of sodium chlorate and 0.0757 mole of potassium persulphate in 18 grams (1 mole) of water was charged into the generator. Sulfuric acid, 1.65 moles of commercial 90% $H_2SO_4$, was introduced into the generator, in small increments, with effective agitation, over a period of 40 minutes while maintaining a temperature of 20°–21° C. Air was forced through the generator at a rate sufficient to maintain the partial pressure of the chlorine dioxide below about 100 mm. of mercury. Chlorine dioxide substantially free from chlorine was produced with decomposition of 99.5% of the total chlorate. The molar ratio of chlorine dioxide generated to chlorate decomposed was 0.951, and the molar ratio of persulphate consumed to chlorine dioxide generated was 0.503.

IV

This operation was carried out in the same apparatus. A slurry consisting of 0.1633 mole of sodium chlorate and 0.0821 mole of sodium persulphate in about 0.6 mole of water was introduced into the generator. Sulfuric acid, 1.18 moles of 96% $H_2SO_4$, was introduced into the generator in small increments, with effective agitation, over a period of 30 minutes while maintaining a temperature of 22°–24° C. Air was forced through the generator at a rate sufficient to maintain the partial pressure of the chlorine dioxide below about 100 mm. of mercury. Chlorine dioxide substantially free from chlorine was produced with decomposition of 99.2% of the total chlorate. The molar ratio of chlorine dioxide generated to chlorate decomposed was 0.987, and the molar ratio of persulphate consumed to chlorine dioxide generated was 0.507.

V

This operation was carried out in the same apparatus. Sulfuric acid, 1.47 moles of commercial 93% $H_2SO_4$, was introduced into the generator. An aqueous solution containing 0.02968 mole of sodium chlorate and 0.01470 mole of sodium persulphate in just sufficient water to effect solution was introduced into the generator through the feeding burette, in small increments, with effective agitation, over a period of 40 minutes while maintaining a temperature of 23°–25° C. Air was forced through the generator at a rate sufficient to maintain the partial pressure of the chlorine dioxide below about 100 mm. of mercury. Chlorine dioxide substantially free from chlorine was produced with decomposition of 98.8% of the total chlorate. The molar ratio of chlorine dioxide generated to chlorate decomposed was 0.975, and the molar ratio of persulphate consumed to chlorine dioxide generated was 0.520.

VI

This operation was carried out in the same apparatus. A mixture of persulfuric acid and sulfuric acid, resulting from the electrolytic oxidation of 4.56 moles of 81.3% (S. G. 1,740) sulfuric acid in a cell with a platinum anode and lead cathode operating at 20–23° C., was introduced into the generator. Sodium chlorate solution containing 0.057 mole of chlorate ion was fed slowly into the rapidly agitated acid mixture. The temperature was maintained at 50° C. The chlorine dioxide gas, which was rapidly generated, was swept out of the generator by a stream of air. Chlorine dioxide substantially free from chlorine was produced. 99.5% of the total chlorate was decomposed. The molar ratio of chlorine dioxide generated to chlorate (as chlorate ion) decomposed was 0.901.

The generated chlorine dioxide can be recovered from the air mixture in which it is carried out of the generator, in operations such as those of the foregoing examples, in any convenient absorption or recovery system.

I claim:

1. In the production of chlorine dioxide, the improvement which comprises reacting a metal chlorate with sulfuric acid in the presence of a persulphate at a temperature not substantially exceeding 50° C.

2. In the production of chlorine dioxide, the improvement which comprises reacting a metal chlorate with sulfuric acid in the presence of a persulphate in proportion approximately in the molar ratio of chlorate to per-sulphate of 2 to 1 at a temperature not substantially exceeding 50° C.

3. In the production of chlorine dioxide, the improvement which comprises producing chlorine dioxide substantially free from elemental chlorine by reacting a metal chlorate with sulfuric acid in the presence of a persulphate at a temperature not substantially exceeding 50° C.

4. In the production of chlorine dioxide, the improvement which comprises reacting a metal chlorate with sulfuric acid in the presence of persulphuric acid ($H_2S_2O_8$) at a temperature not substantially exceeding 50° C.

5. In the production of chlorine dioxide, the improvement which comprises reacting a metal chlorate in a substantially saturated aqueous solution with concentrated sulfuric acid in the presence of a persulphate at a temperature not substantially exceeding 50° C.

6. In the production of chlorine dioxide, the improvement which comprises gradually introducing at a low rate a substantially saturated aqueous solution of metal chlorate and persulphate in molar ratio of approximately 2 to 1 respectively into a substantial excess of sulfuric acid and reacting the metal chlorate with the sulfuric acid in the presence of the persulphate at a temperature not substantially exceeding 50° C.

7. In the production of chlorine dioxide, the improvement which comprises gradually introducing concentrated sulfuric acid into a substantially saturated aqueous mixture of metal chlorate and persulphate.

8. In the production of chlorine dioxide, the improvement which comprises reacting a metal chlorate with sulfuric acid in the presence of a compound selected from the group consisting of persulphates of alkali metals and of alkaline earth metals at a temperature not substantially exceeding 50° C.

9. In the production of chlorine dioxide, the improvement which comprises reacting a metal chlorate with sulfuric acid in the presence of a persulphate at a temperature ranging from about 20° C. to about 30° C.

EDWARD CORNELIUS SOULE.